UNITED STATES PATENT OFFICE.

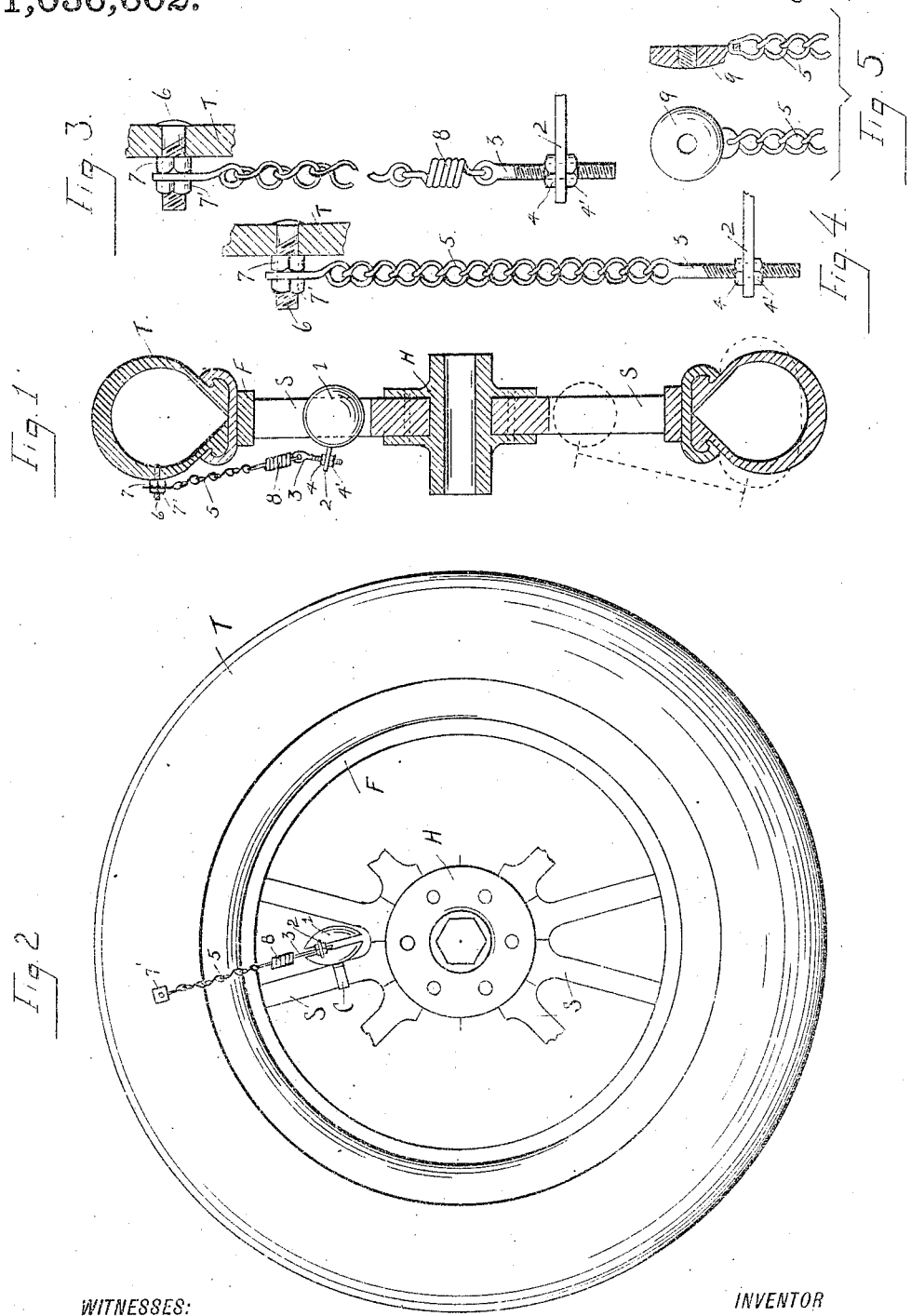

FRED LEO FULLER, OF SACRAMENTO, CALIFORNIA.

SIGNAL FOR PNEUMATIC TIRES.

1,036,602.

Specification of Letters Patent. Patented Aug. 27, 1912.

Application filed February 3, 1912. Serial No. 675,230.

*To all whom it may concern:*

Be it known that I, FRED LEO FULLER, a citizen of the United States, residing at Sacramento, in the county of Sacramento and State of California, have invented new and useful Improvements in Signals Designed for Use in Connection with Pneumatic Tires of Automobiles, Autotrucks, and the Like, of which the following is a specification.

This invention relates to signals and has for one object to provide for giving an audible signal or alarm to the driver of a motor-car that the pneumatic tire, to which this invention has been applied, has become deflated, on account of a puncture or other cause, to such an extent that further running his machine with the tire in this condition will prove injurious to the same. This and other objects are secured by the novel arrangement shown in the accompanying drawings, described in the specification, and pointed out in the claims.

Referring to the drawings, Figure 1 represents a sectional view of an automobile wheel and tire to which the signal is attached. Fig. 2 is a front elevation of the same wheel. Fig. 3 is an enlarged view of the chain and means employed to connect the same to the tire and to the bell, and Fig. 4 shows a modification of the flexible connection. Fig. 5 shows a modification of the manner of making the connection between the chain 5 and the bolt 6.

In the drawings, T is a tire, F the felly, S the spokes, and L the hub.

1 is a bell of any suitable construction having a projecting operating lever 2, which lever is under tension by reason of a spring within the bell (not shown) which tends to pull the lever in a direction opposite that to which the chain 5 draws it; the bell is rigidly clamped onto one of the spokes by the clamp C. Passing through a perforation near the end of the lever 2 is an adjusting bolt 3 having adjusting threaded jam-nuts 4 and 4'.

6 is a bolt passing through a perforation in the side of the outer casing of the pneumatic tire in relatively the position indicated in the drawing, said bolt being held securely by the nut 7. Secured to the bolts 3 and 6 is a flexible connection composed of a closed coil spring 8 and a chain 5, the tension of the coil spring being greater than that of the spring within the bell and which actuates the lever. The spring 8 is held in connection with the bolt 6 by the nut 7'.

The operation of my signaling device is as follows: The pneumatic tire being inflated to proper running pressure and the bell clamped into position on one of the spokes, the connection 5—8 is brought under tension by means of the adjusting nuts 4 and 4' so that the lever 6 of the bell is drawn toward the tire into such a position that should the tension on the chain be slackened to a predetermined point the bell will ring by reason of the lever being acted upon by its own operating spring.

The novelty and utility of this invention will become apparent, for should the pneumatic tire become deflated to a certain extent (see dotted lines in Fig. 1) the tension on the flexible connection 5—8 will be slackened by reason of the tire flattening under the load of the motor-car, causing the bell to ring. With each revolution of the deflated tire, the connection 5—8 will first be brought under tension and then released, causing an almost continuous ringing which will attract the attention of the operator of the car who is thus given immediate warning that the tire needs to be reinflated if he would save it from injury.

It is of considerable advantage in adjusting the tension on the chain to test the working of the bell without releasing the chain from its connection; this is done by pressing on the lever 2, the coil spring 8 readily permitting this to be done. As the tension of the coil spring is greater than that of the spring which actuates the lever within the bell, this coil spring in no way interferes with the operation of this invention.

On account of numerous objections to the use of a rod or other rigid means for actuating the bell, I have chosen to describe the one with the flexible connection; instead of the chain a metallic ribbon or flexible cord may be used.

In place of the nuts 7 and 7', the nut 9, see Fig. 5, may be employed. This nut is provided with an ear integral therewith through which is a perforation for receiving the link of the chain 5. By this arrangement, the chain is permitted to lie closer to the tire.

The arrangement shown is simple and inexpensive, and, further has the advantage that if the alarm is sounded accidentally, on account of a sharp turning of a corner by the motor-car or the tire striking an obstruction, it will not necessitate the driver of the car stopping his machine in order to readjust the alarm, as would be required if the alarm were sounded by the releasing or tripping of a lever or catch.

The device may readily be applied to any automobile wheel by simply making a small perforation through the side of the outer casing of the tire and passing the bolt 6 therethrough and securing same in position by the nut 7; clamping the bell to a proper position on the spoke, and securing the flexible connection to the bolt 6 and lever 2 by means of the nuts as indicated. If the tension on the chain requires to be changed it may readily be done by adjusting the nuts 4 and 4'. In place of the connection 5—8, composed in part of chain and in part of the coil spring, a chain only may be employed, see Fig. 4.

It will be noted that various changes may be made in construction without in any way departing from the spirit or sacrificing any of the advantages of this invention.

Having thus described the invention, what I claim as new and desire by Letters Patent to secure, is—

1. In a tire signal of the class described, the combination with a vehicle wheel equipped with a pneumatic tire, of a bell having a projecting operating lever, said bell being clamped onto one of the spokes, and said lever being under tension by reason of a spring within the bell, a chain under tension connected to said lever, and a bolt, having nuts, to which the opposite end of the chain is secured, said bolt passing through a perforation in the side of the outer casing of the pneumatic tire.

2. In a tire signal of the class described, the combination with a vehicle wheel equipped with a pneumatic tire, of a bell having a projecting operating lever, said bell being clamped onto one of the spokes, and said lever being under tension by reason of a spring within the bell, a chain under tension connected to an adjusting bolt having jam-nuts and passing through a perforation in the lever, and a second bolt, having nuts, to which the opposite end of the chain is secured, said bolt passing through a perforation in the side of the outer casing of the pneumatic tire.

3. In a tire signal of the class described, the combination with a vehicle wheel equipped with a pneumatic tire, of a bell having a projecting operating lever, said bell being clamped onto one of the spokes, and said lever being under tension by reason of a spring within the bell, a flexible connection composed of a chain and a closed coil spring whose tension is greater than that of the spring which actuates the lever of the bell, said flexible connection being secured to the lever, and a bolt, having nuts, to which the opposite end of the flexible connection is secured, said bolt passing through a perforation in the side of the outer casing of the pneumatic tire.

4. In a tire signal of the class described, the combination with a vehicle wheel equipped with a pneumatic tire, of a bell having a projecting operating lever, said bell being clamped onto one of the spokes, and said lever being under tension by reason of a spring within the bell, a flexible connection composed of a chain and a closed coil spring whose tension is greater than that of the spring which actuates the lever of the bell, said flexible connection being secured to an adjusting bolt having jam-nuts and passing through a perforation in the lever, and a second bolt, having nuts, to which the opposite end of the flexible connection is secured, said bolt passing through a perforation in the side of the outer casing of the pneumatic tire.

FRED LEO FULLER.

Witnesses:
J. J. McDonald,
A. Wulff.